(12) United States Patent
Kochan

(10) Patent No.: US 8,591,367 B2
(45) Date of Patent: Nov. 26, 2013

(54) NON-BACKDRIVABLE GEAR SYSTEM

(76) Inventor: Stephen John Kochan, Skaneateles, NY (US)

( * ) Notice: Subject to any disclaimer, the term of this patent is extended or adjusted under 35 U.S.C. 154(b) by 457 days.

(21) Appl. No.: 13/030,068

(22) Filed: Feb. 17, 2011

(65) Prior Publication Data

US 2011/0201473 A1 Aug. 18, 2011

Related U.S. Application Data

(60) Provisional application No. 61/305,502, filed on Feb. 17, 2010.

(51) Int. Cl.
*F16H 48/06* (2006.01)

(52) U.S. Cl.
USPC .......................................... 475/149; 475/343

(58) Field of Classification Search
USPC .................................. 475/149, 343
See application file for complete search history.

(56) References Cited

U.S. PATENT DOCUMENTS

| | | | |
|---|---|---|---|
| 378,700 A | 2/1888 | Manning | |
| 507,695 A | 10/1893 | Thomson | |
| 2,137,778 A | 11/1938 | McCullough | |
| 3,602,070 A | 8/1971 | Verge et al. | |
| 4,366,727 A | 1/1983 | Jonsson | |
| 4,942,781 A | 7/1990 | Hori | |
| 5,221,239 A | 6/1993 | Catlett | |
| 6,626,792 B2 | 9/2003 | Vranish | |
| 2011/0177904 A1 * | 7/2011 | Kirschner et al. | 475/149 |

* cited by examiner

*Primary Examiner* — Erin D Bishop
(74) *Attorney, Agent, or Firm* — Katherine H. McGuire, Esq.; Woods Oviatt Gilman LLP

(57) ABSTRACT

A self-locking non-backdrivable gear system in one embodiment includes an input spur gear mounted to a drive shaft, the input spur gear positioned in meshing engagement with a ring gear on which is mounted at least one planet locking gear which rotates with the ring gear and rotates on its own mounting. The planet locking gear meshes with a fixed spur gear and an output spur gear connected to a bi-rotational load bearing device. The fixed and output gears have different number of teeth and will lock in place with the planet gear should a rotational force be applied to the load bearing device in the absence of a rotational force at the drive shaft.

2 Claims, 10 Drawing Sheets

CROSS SECTION TAKEN AS SHOWN IN FIGURE #2A

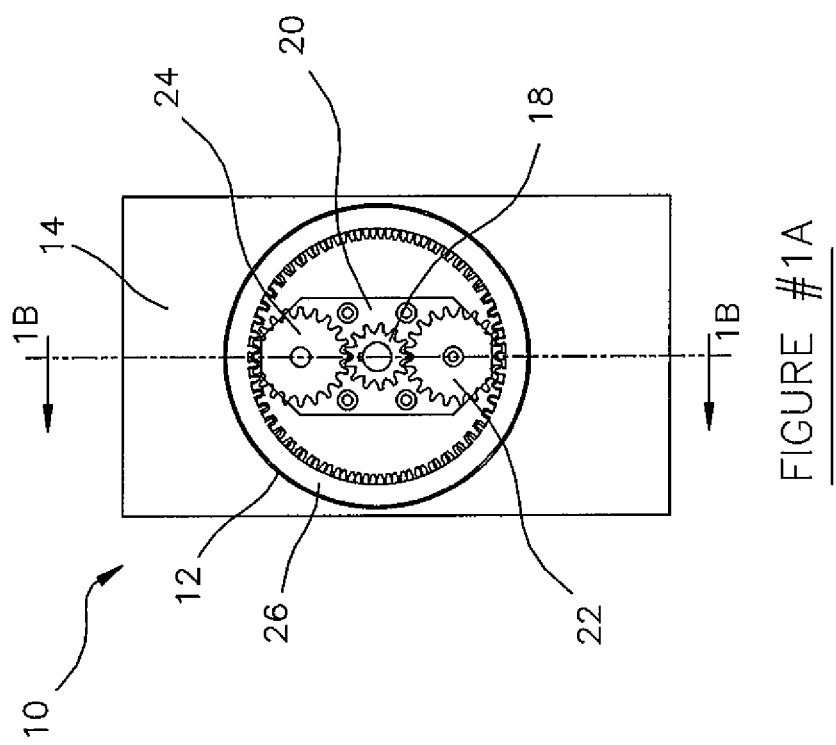
FIGURE #1A

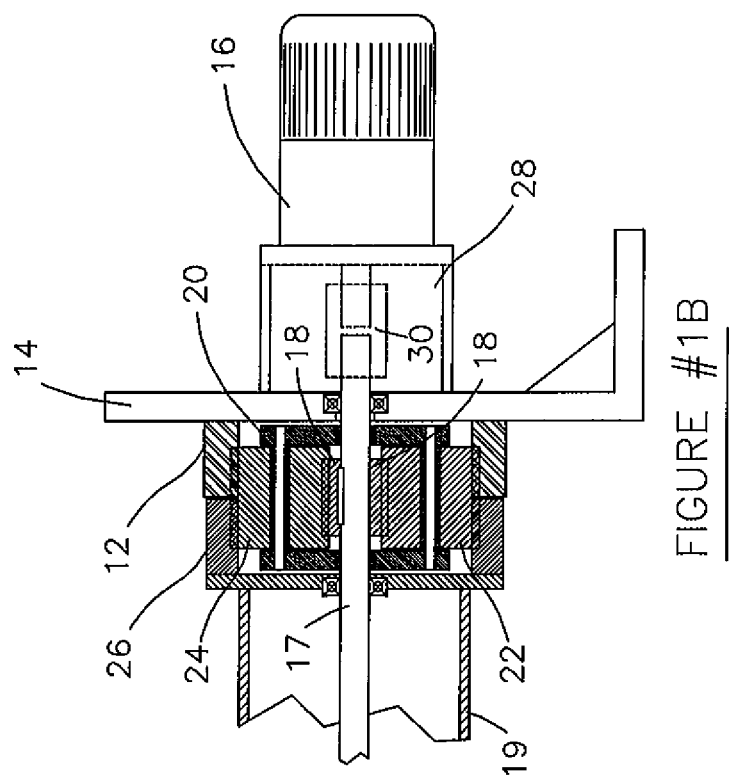

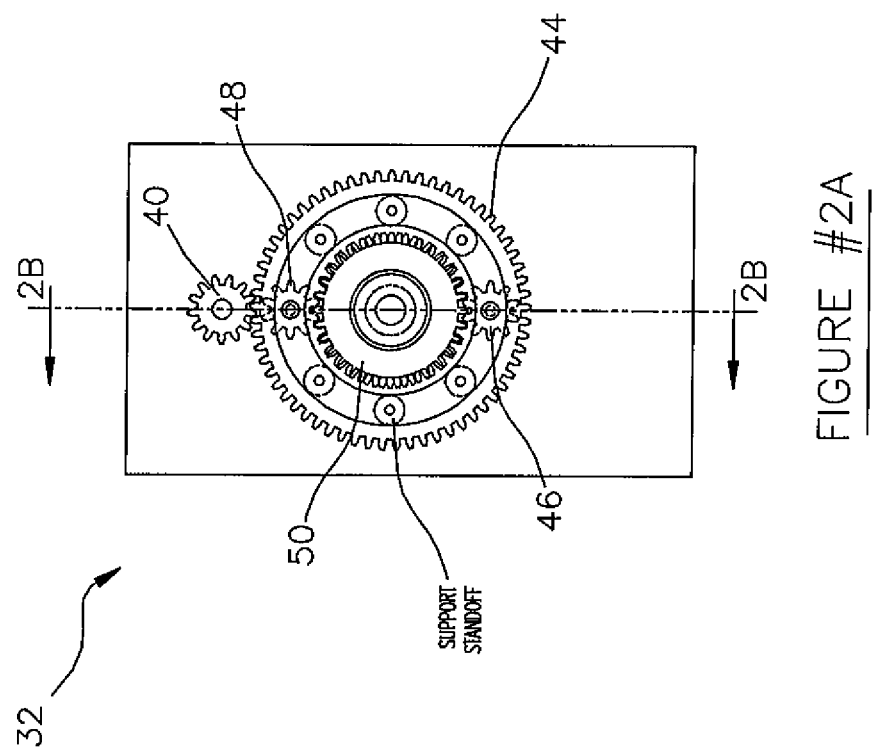

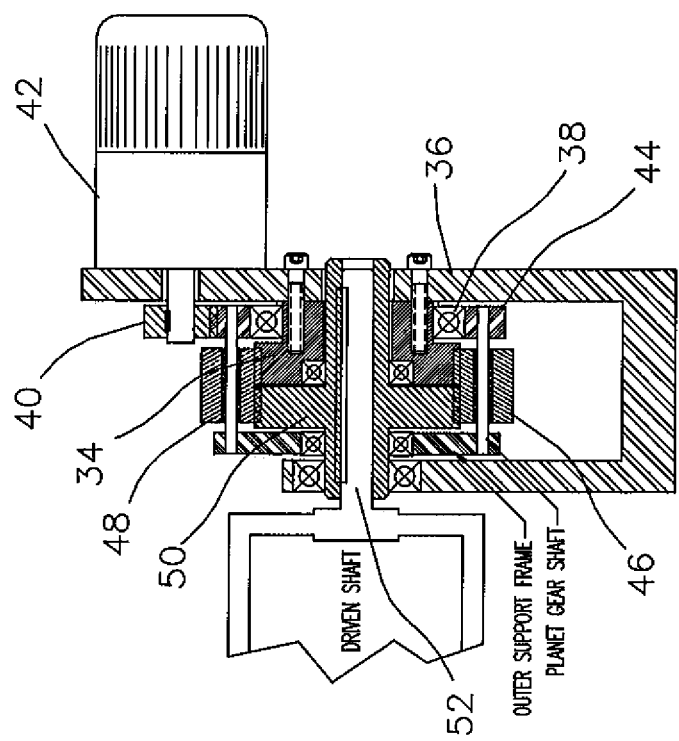
FIGURE #2B
CROSS SECTION TAKEN AS SHOWN IN FIGURE #2A

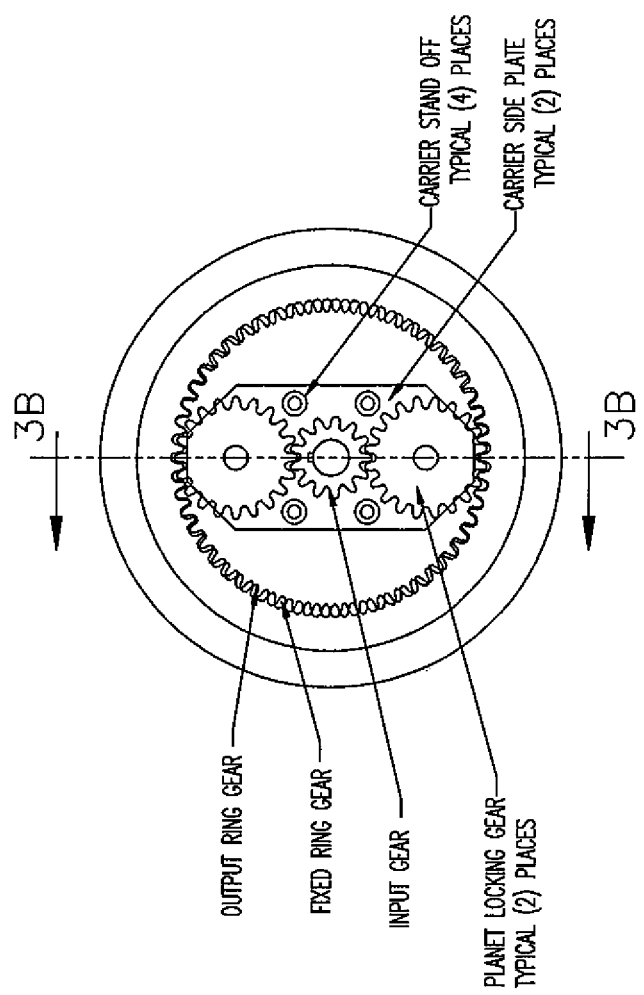

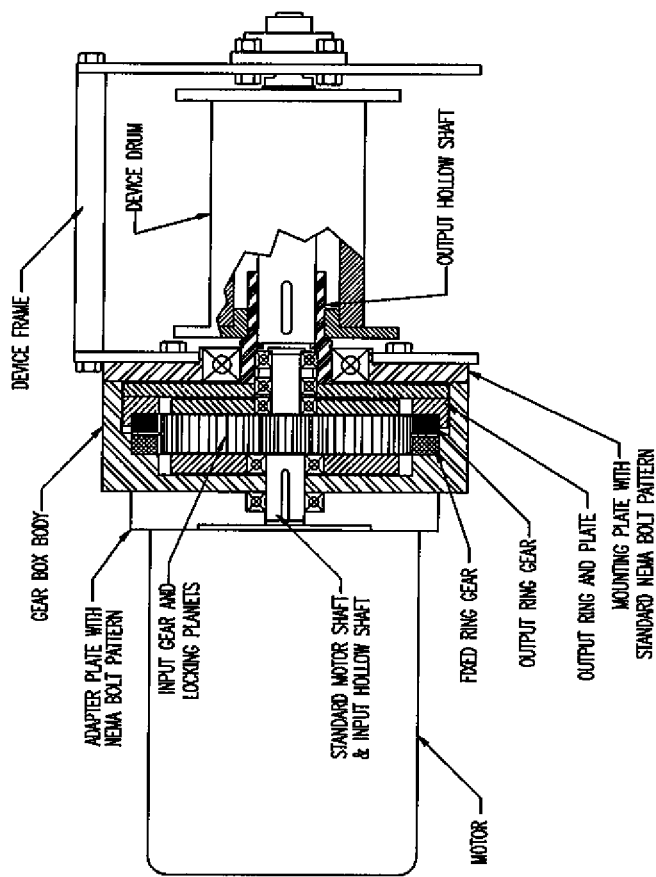
FIGURE #3B
CROSS SECTION TAKEN AS SHOWN IN FIGURE #3A

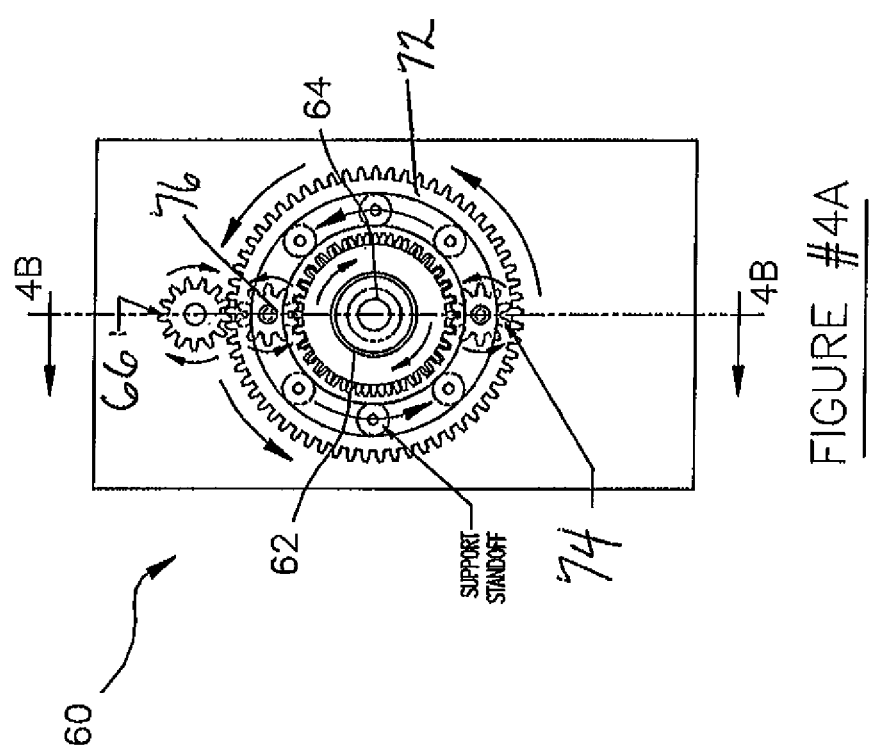

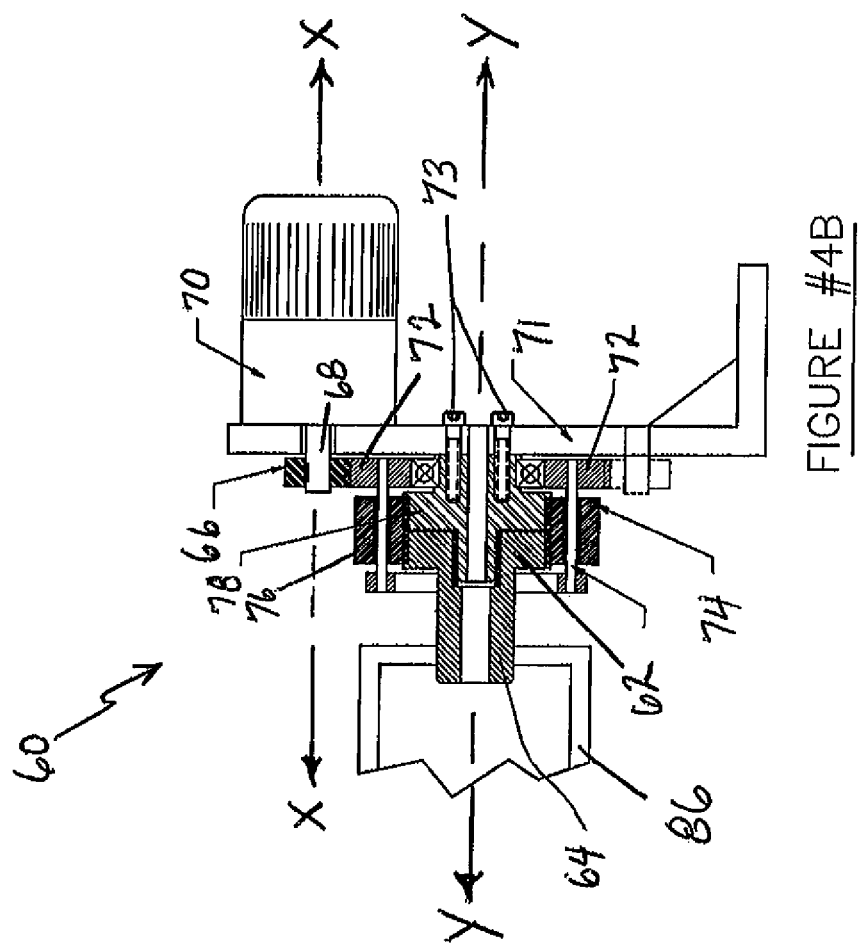
FIGURE #4B

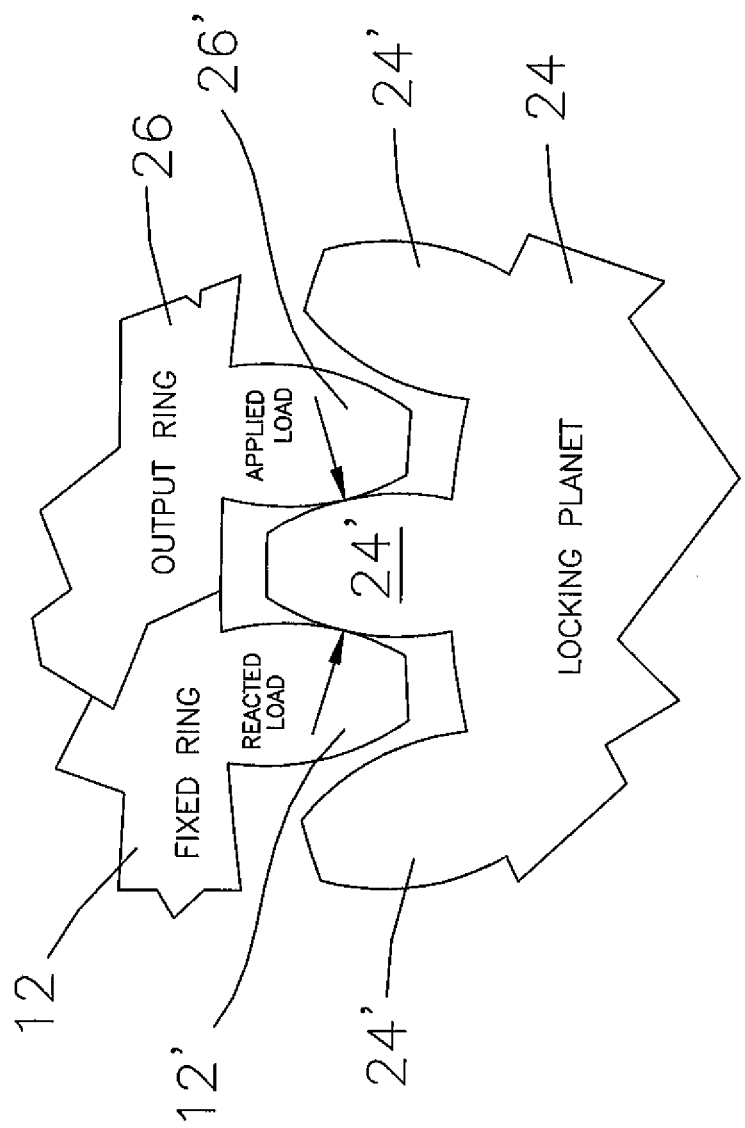

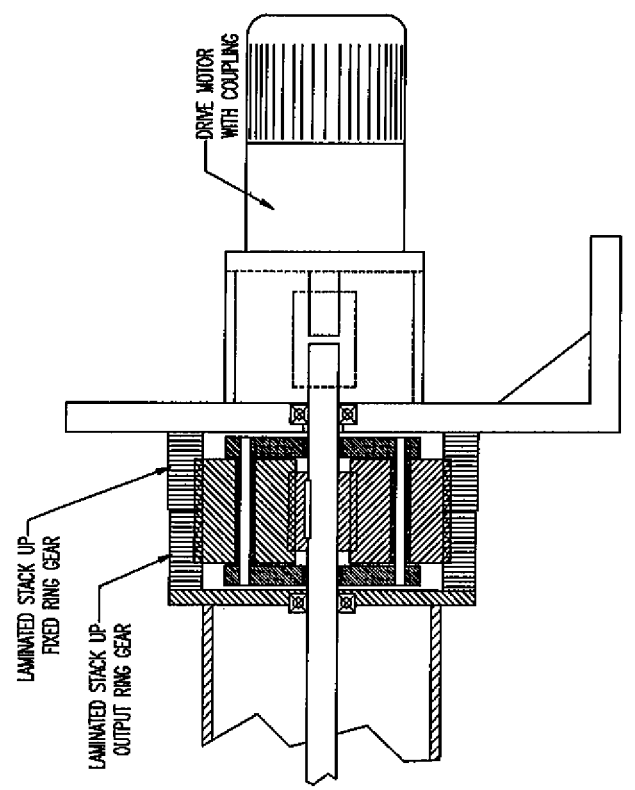

NON-BACKDRIVABLE GEAR SYSTEM

BACKGROUND OF THE INVENTION

The present invention generally relates to the field of gear design, and more particularly relates to gear systems which are self-locking and non-backdrivable.

An example of prior art gear systems which are self-locking and non-backdrivable include harmonic gear assemblies which employ flexible metal bands or flexible metal cups that have gear teeth machined into their outer periphery. These bands or cups are forcibly deformed with inner oval cams that employ many pins or balls or bearings, against fixed ring type spur gears. These configurations allow for the smooth movement of the flex cup or flex band, while only engaging several teeth at a minimum of one position, but usually two or three positions. The bi-lobular or tri-lobular cams are rotated one full revolution which only engages a small number of teeth in the fixed outer ring gear. This creates a gear ratio relative motion, while locking the band or cup to the fixed outer ring gear.

Other prior art embodiments utilize two ring gears with different numbers of teeth at different pitch diameters, or different tooth sizes at the same pitch diameter. This embodiment employs an internal gear set with two sets of spur gear planets that share the same set of pivot shafts. By fixedly attaching two different sized gears on the same set of shafts, or two same sized gears with different numbers of teeth on the same set of shafts, these assemblies can be rotated within a side-by-side ring gear pair and yield a gear ratio. Two gears on the same shaft with different pitch diameters or different numbers of teeth are difficult to manufacture in one piece, and unnecessarily complex as a pair of pinned or bolted or welded gears. Separate gears fixed together are not as robust as a continuous metal cross section.

Thus, while self-locking or non-backdrivable gearing concepts have been proposed in the past, these prior art designs are typically complex, costly to produce and/or composed of components that are not robust and/or redundant. Additionally, these prior designs are unnecessarily complex and made up of many pins, balls, bearings, bands, and fasteners.

SUMMARY OF THE INVENTION

The present invention addresses the above drawbacks of the prior art by providing simple and low-cost gearbox systems that can be driven in a forward and reverse direction through an input motor shaft, but cannot be back-driven through its output gearing. This also applies to any of the inventive gearing systems without the motor. For example, the input rotation can simply be a hand crank or equivalent.

The inventive gear systems have particular application in the field of overhead lifting machinery although the invention is not so limited. For example, winch machinery that utilizes a cable winding onto a cylindrical or pile-up drum must be able to wind in both a clockwise and counterclockwise direction, but not drop the load. Further, in the ease of machinery that uses chain or screwjack components, a non-backdriving, self locking gearbox would offer benefits superior to existing configurations made up of friction brakes and worm drive gearboxes. The integrated benefits of a planetary type geartrain allow for a compact assembly.

The present inventive gear systems use simple spur and ring gears which are easy to manufacture and mechanically efficient. The inventive gear systems are a marked improvement over existing prior art. There are no metal flex cups or flex bands required, and high precision manufacture is not essential, yet not precluded. Additionally, the inventive gear systems are adapted to optionally integrate economical laminated ring gears that are laser cut or punched (or equivalent) out of thin steel (⅛" or any thickness) and then hardened or shave punched and hardened (or equivalent). This method of manufacture could also be applied to any material sufficient for the required loads. These would include any appropriate material such as, for example, brass, aluminum, composites, alloys, plastic, laminates, etc. This particular gear manufacturing method is modular, cost effective, limits tooling costs, and allows for producing a single type of punched module, then stacking to any thickness required based on load. The stacked assembly can then be pinned and bolted to a base plate, or riveted to a base plate or equivalent.

With reference to the application of the inventive gear systems, by virtue of its configuration as a ring gear, the invention can be effectively integrated into any rotating machinery which utilizes a cylinder. The output ring gear can be mounted adjacent to or positioned inside of the cylinder and remain mechanically protected. The embodiments shown in the attached figures are of an open geared assembly, which would utilize grease as a lubricant. It could also be fitted with seals and covers to run in an oil bath where beneficial and/or required.

The output spur gear design (referred to herein as the "inside-out" configuration) integrates an offset drive motor allowing for a hollow output shaft. This is particularly useful for rotating machinery that requires output electrics or electronics. The hollow through the center output shaft can pass wiring through to a rotating connection, as well as the simple insertion of downstream equipment shafts. This would be particularly useful for cable drums winding electrified cable, and turntables with electrics/electronics on board, for example. This design also utilizes open gearing and grease, yet can be adapted to run in an oil bath.

BRIEF DESCRIPTION OF DRAWINGS

FIG. 1A is a front elevational view of a first embodiment of the invention;

FIG. 1B is a cross-sectional view as taken generally along the line 1B-1B of FIG. 1A;

FIG. 2A is a front elevational view of another embodiment of the invention;

FIG. 2B is a cross-sectional view as taken generally along the line 2B-2B in FIG. 2A;

FIG. 3A is a front elevational view of another embodiment of the invention;

FIG. 3B is a cross-sectional view as taken generally along the line 3B-3B in FIG. 3A;

FIG. 4A is a front elevational view of another embodiment of the invention;

FIG. 4B is a cross-sectional view as taken generally along the line 4B-4B in FIG. 4A;

FIG. 5 is an enlarged, schematic, fragmented plan view showing the gear teeth engagement; and FIG. 6 is the view of FIG. 1B showing an alternate embodiment having a laminated gear set.

DETAILED DESCRIPTION OF PREFERRED EMBODIMENTS

Referring now to the drawing, there is seen in FIGS. 1A and 1B a first gear system embodiment referred to herein as the "output ring gear system" and indicated generally by the reference numeral 10. This embodiment has a fixed ring gear 12 mounted to the gear support plate 14. The input motor 16 rotates the input sun gear 18 via drive shaft 17 which connects to a cylinder drum 19 on which a cord connected to a load may be wound (not shown). In an alternative embodiment the sun gear 18 can be eliminated and the motor 16 allowed to drive the support spider frame 20. Sun gear 18 then rotates the planet locking gears 22 and 24 that are supported by the gear support plate 14. As the sun gear 18 rotates the planet gears 22 and 24, gears 22 and 24 are driven around the fixed ring gear 12. In this embodiment, the output ring gear 26 has a pitch diameter that is the same as the fixed ring gear 12, but output ring gear 26 has 2 fewer teeth than fixed ring gear 12. The tooth form 12' of the fixed ring gear 12 is shown as an involute form, but is not necessarily limited to this geometry (see also FIG. 5). The output ring gear 26 teeth 26' are a modified involute form. In the simplest embodiment, the tooth form is involute with the spacing between teeth adjusted to take up the space from the removal of the 2 teeth. For example, the difference in tooth spacing for 53/51 teeth and approximately 8 inch diameter ring gear is approximately 0.008" per tooth. Because the output ring has 2 fewer teeth, each revolution of the planets yields an advancement of 2 teeth. By virtue of the fact that the fixed ring gear and the output ring gear are rotating in the opposite directions, the planet locking gears' engaged teeth are in shear and act as keys, not allowing for the output to back drive.

Example 1

Output Ring Gear System

A gear system was produced with the fixed ring 12 having 53 teeth and the output ring 26 having 51 teeth producing an approximate 25 to 1 gear ratio. The sun gear 18 was produced with 13 teeth and the planet gear 24 was produced with 20 teeth 24' producing an additional ratio of 1.5 to 1 yielding an overall ratio of approximately 130 to 1. The design also allows for rotating the spider support frame 20 and allowing the sun gear 18 to idle. This shift yields an end ratio of 67 to 1 (input torque is applied directly to the spider frame 20 with sun gear 18 eliminated).

It is understood that the tooth numbers and ratios listed above are an example and are therefore not to be construed as limiting the invention. It will be appreciated to those skilled in the art that the gearing concept of Example 1 can be scaled up or down in size of gears or number of teeth or number of gears or gear configuration.

FIG. 1B shows motor 16 mounted on a housing 28 to accommodate a shaft coupling 30 although mount housing 28 can be removed and a standard planetary gearbox (not shown) substituted therefore. This allows for a speed reduction and torque increase of the motor 16 before it enters the gear system 10. This would allow for maximum manufacturing tolerance, adding to the cost effectiveness of the unit. The standard planetary assembly could additionally be manufactured as a laminated gear stack assembly as will be described below.

FIG. 2A shows another embodiment of the invention referred to herein as the "output spur gear system" and denoted generally by the reference numeral 32. In FIG. 2B, the fixed spur gear 34 is shown, but not limited to, bolted to the frame support plate 36. Attached to plate 36 is a bearing 38 which supports the gear support frame/input ring gear. The input spur gear 40 is rotated by the drive motor 42 which rotates the input ring gear 44. The input ring gear 44 supports the planet locking gears 46 and 48. Planet gears 46 and 48 engage and rotate around fixed spur gear 34. The fixed spur gear 34 and planet gears 46 and 48 are of, but not limited to, involute form. The output spur gear 50 has 2 fewer teeth than fixed spur gear 34 and is of, but not limited to, a modified involute form, as described above with regard to the description of the output ring gear system 10. Also, as described in the output ring gear system 10, the planet locking gears 46 and 48 act as keys and do not allow for the output drive shaft 52 to back drive.

FIGS. 3A and 3B show an assembled configuration that allows for the gearbox to be directly attached to a NEMA (National Electrical Manufacturers' Association) "C-Faced" motor and in turn the gearbox may be attached to any piece of machinery employing a NEMA bolt pattern mounting. The end result is a gearbox with "NEMA in and NEMA out" configuration. This allows for a simplified modular approach to final machine design utilizing this gearbox. The internal gear configuration is the same as is seen in FIGS. 1A and 1B.

FIGS. 4A and 4B shows an alternate embodiment referred to herein as the "inside out spur gear system" indicated generally by the reference numeral 60 and showing an output spur gear 62 with a protruding hollow shaft 64. Attaching this gear system configuration to a drum or other device requires only a keyed hole which is keyed to shaft 64, and not a protruding journal. This is a main advantage of this configuration. More particularly, in this inside-out spur gear embodiment, an input spur gear 66 is adapted to be mounted to a drive shaft 68 connected to a drive source such as motor 70, for example, for rotation of input spur gear 66 about the axis X-X of the drive shaft. A ring gear 72 is positioned in meshing engagement with input spur gear 66 about an axis extending Y-Y in parallel, spaced relation to said drive shaft axis X-X. At least one but preferably two (or more) first and second planet locking gears 74 and 76 are rotatably mounted on ring gear 72 with second planet locking gear 76 rotatably mounted on ring gear 72 in 180° off-set relation with respect to first planet locking gear 74 about the full 360° circumference of ring gear 72, whereby the first and second planet locking gears 74, 76 rotate with ring gear 72 and also rotate about their own respective mounting axes as indicated by the directional arrows in FIG. 4A. A fixed spur gear 78 having N number of gear teeth is fixedly mounted to frame 71 via bolts 73 in meshing engagement with first and second planet gears 74, 76 and in adjacent, coaxial relation with ring gear 72. An output spur gear 80 having N+/−X number of gear teeth (e.g., two less teeth than the fixed spur gear 78 as in the output ring gear system) is rotatably mounted in meshing engagement with first and second planet gears 74, 76 and in coaxial relation with fixed spur gear 78 and ring gear 72. Output spur gear 80 is positioned adjacent fixed spur gear 78 on the side thereof opposite ring gear 72. Output spur gear 62 further includes an output shaft 64 which may be hollow and formed integrally therewith, adapted for mounting to a bi-rotational load-bearing part such as cylinder drum 86, for example. Thus, rotation of said input spur gear 66 causes rotation of ring gear 72 which causes rotation of the first planet locking gear 74 (and, if present, additional planet locking gears such as second planet locking gear 76 as seen in FIGS. 4A, B) which causes rotation of output spur gear 62 which causes rotation of the bi-rotational load-bearing part 86. In the absence of rotation of input spur gear 66, a rotational force applied to output spur gear 62 (e.g., by the force of the load on part 86) causes the gear teeth on the fixed and output spur gears 78, 62, respectively, to lock in place with the first (and second or more, if present) planet locking gear 74.

FIG. 5 is a schematic diagram illustrating the "torque balanced" basic relationship between the fixed and output ring gears 12, 26, respectively, with respect to the locking planet gear 24. This torques balanced relationship also applies to the fixed and output spur gears in the inside out gear system 60. As the output ring gear 26 tries to rotate the locking planet gear 24 on the fixed ring gear 12, the engaged teeth act as shear keys. This is true whether there is a driving sun gear in the center of the planet spider plate as well as if there is nothing in the center and the spider plate is being driven by the input motor. The "Applied Load" and "Reacted Load" arrows are equal and in opposite directions. Additionally, because the general configuration is a central carrier with 2 planets 180 degrees apart, any gear twist due to the shear action between ring gears are in equal and opposite directions on each planet, and therefore neutralize each other. Any thrust toward (or away from) the center of the gearbox is additionally neutralized in both the internal and inside-out configurations.

FIG. 6 shows the stacked laminated ring gear configuration for economical manufacture of the output ring gear 26 design. This concept also applies to the spur gear (inside out gear system 60) configuration. Additionally, in some applications, all gears would be manufactured of stack laminated materials. An alternate embodiment would combine stack laminated ring gears with roll formed or extruded solid steel involute or modified spur gears. Fully extruded aluminum spurs and ring gear configurations would also be used for some configurations. Materials of construction for gears and shafts and housings would include, but not be limited to, metals, plastics, composites, ceramics, woods, plywoods, castings, metal powders, metal or plastic extrusions, and punched blanks, for example.

What is claimed is:

1. A self-locking non-backdrivable gear system, comprising:
    a) an input spur gear adapted to be mounted to a drive shaft for rotation of said input spur gear about an axis of the drive shaft;
    b) a ring gear positioned in meshing engagement with said input spur gear about an axis extending in parallel, spaced relation to said drive shaft axis;
    c) a first planet locking gear rotatably mounted on said ring gear, whereby said first planet locking gear rotates with said ring gear and also rotates about its own mounting axis;
    d) a fixed spur gear having N number of gear teeth and fixedly mounted in meshing engagement with said first planet locking gear and in adjacent, coaxial relation with said ring gear;
    e) an output spur gear having N+/−X number of gear teeth and rotatably mounted in meshing engagement with said first planet locking gear and in coaxial relation with said fixed spur gear and said ring gear, said output spur gear positioned adjacent said fixed spur gear on a side of said fixed spur gear opposite said ring gear, said output spur gear further including an output shaft adapted for mounting to a bi-rotational load-bearing part,
        whereby rotation of said input spur gear causes rotation of said ring gear which causes rotation of said first planet locking gear which causes rotation of said output spur gear which causes rotation of the bi-rotational load-bearing part, and whereby in the absence of rotation of said input spur gear a rotational force applied to said output spur gear causes said gear teeth on said fixed and output spur gears to lock in place with said first planet locking gear.

2. The gear system of claim 1 and further comprising a second planet locking gear rotatably mounted on said ring gear in 180° off-set relation with respect to said first planet locking gear about a full 360° circumference of said ring gear, whereby said first and second planet locking gears rotate with said ring gear and also rotate about their own respective mounting axes, whereby in the absence of rotation of said input spur gear a the rotational force applied to said output spur gear causes said gear teeth on said fixed and output spur gears to lock in place with said first and second planet locking gears.

* * * * *